(12) United States Patent
Hathaway et al.

(10) Patent No.: US 9,248,843 B2
(45) Date of Patent: Feb. 2, 2016

(54) DEVICE, SYSTEM AND METHOD FOR GROUND LINE HAUL

(71) Applicants: Richard C. Hathaway, Greenville, OH (US); M. Kent Bridges, New Madison, OH (US)

(72) Inventors: Richard C. Hathaway, Greenville, OH (US); M. Kent Bridges, New Madison, OH (US)

(73) Assignee: KACI INTERMODAL SYSTEMS, LLC, Greenville, OH (US)

(*) Notice: Subject to any disclaimer, the term of this patent is extended or adjusted under 35 U.S.C. 154(b) by 0 days.

(21) Appl. No.: 14/166,038

(22) Filed: Jan. 28, 2014

(65) Prior Publication Data

US 2014/0212258 A1    Jul. 31, 2014

Related U.S. Application Data

(60) Provisional application No. 61/757,318, filed on Jan. 28, 2013.

(51) Int. Cl.
| *B65D 88/00* | (2006.01) |
| *B61B 1/00* | (2006.01) |
| *B61F 3/08* | (2006.01) |
| *B61D 3/04* | (2006.01) |

(52) U.S. Cl.
CPC . *B61B 1/005* (2013.01); *B61D 3/04* (2013.01); *B61F 3/08* (2013.01); *B65D 2590/0066* (2013.01); *Y02T 30/30* (2013.01)

(58) Field of Classification Search
USPC .......................................................... 280/419
See application file for complete search history.

(56) References Cited

U.S. PATENT DOCUMENTS

| 5,222,599 | A  | * | 6/1993  | Boyce ........................... 206/366 |
| 6,010,021 | A  | * | 1/2000  | Zuidam et al. ................. 220/1.5 |
| 6,478,182 | B2 | * | 11/2002 | Karpisek ....................... 220/662 |
| 6,675,540 | B1 | * | 1/2004  | Rokes ............................. 52/143 |
| 6,939,098 | B2 | * | 9/2005  | Schults ......................... 414/459 |
| 7,500,563 | B2 | * | 3/2009  | Baehler et al. ................ 206/509 |
| 8,302,975 | B2 | * | 11/2012 | Hergeth ..................... 280/47.19 |
| 8,490,993 | B2 | * | 7/2013  | Benoit .......................... 280/204 |
| 2009/0032530 | A1 | * | 2/2009 | Chu .............................. 220/4.28 |

* cited by examiner

*Primary Examiner* — Saul Rodriguez
*Assistant Examiner* — Mark Hageman
(74) *Attorney, Agent, or Firm* — James Ray and Assocs

(57) ABSTRACT

A device for transporting freight articles in a ground or rail haul operations comprises a hollow housing including four corner sections, side walls, two center sections defining four openings each disposed between one edge of a center section and an edge of a respective corner section, a bottom portion and a top portion, wherein the two center portions are manufactured from see through or clear material. A door is mounted to selectively open and close a respective opening and swinging outwardly and towards a respective corner portion to selectively open the respective opening. Two channels are provided in the bottom portion, each in open communication with opposite sides of the bottom portion. Four feet or wheels are mounted on the bottom portion. Four receptacles are provided in the top portion, each sized and shaped to receive a foot therewithin.

11 Claims, 10 Drawing Sheets

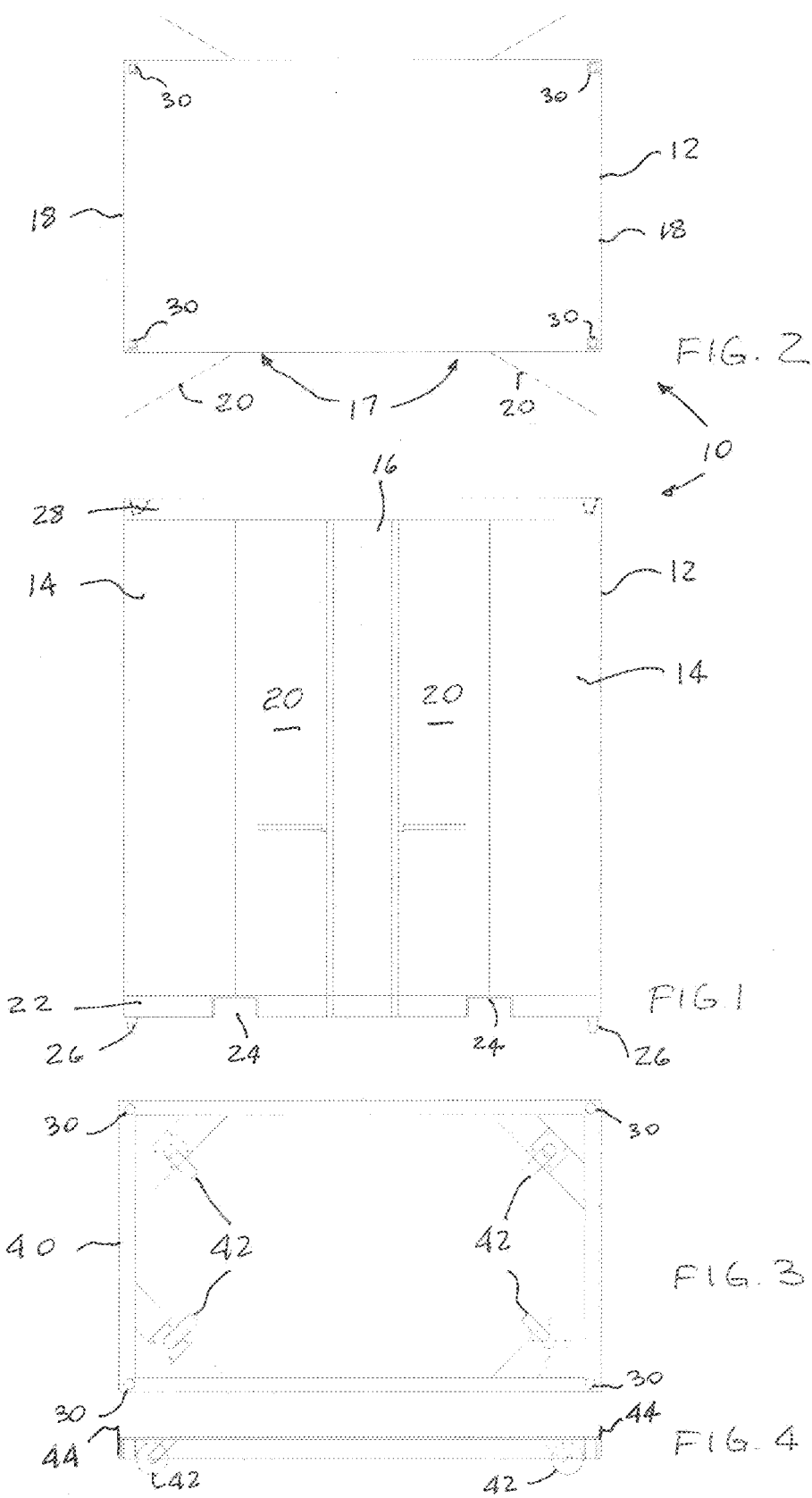

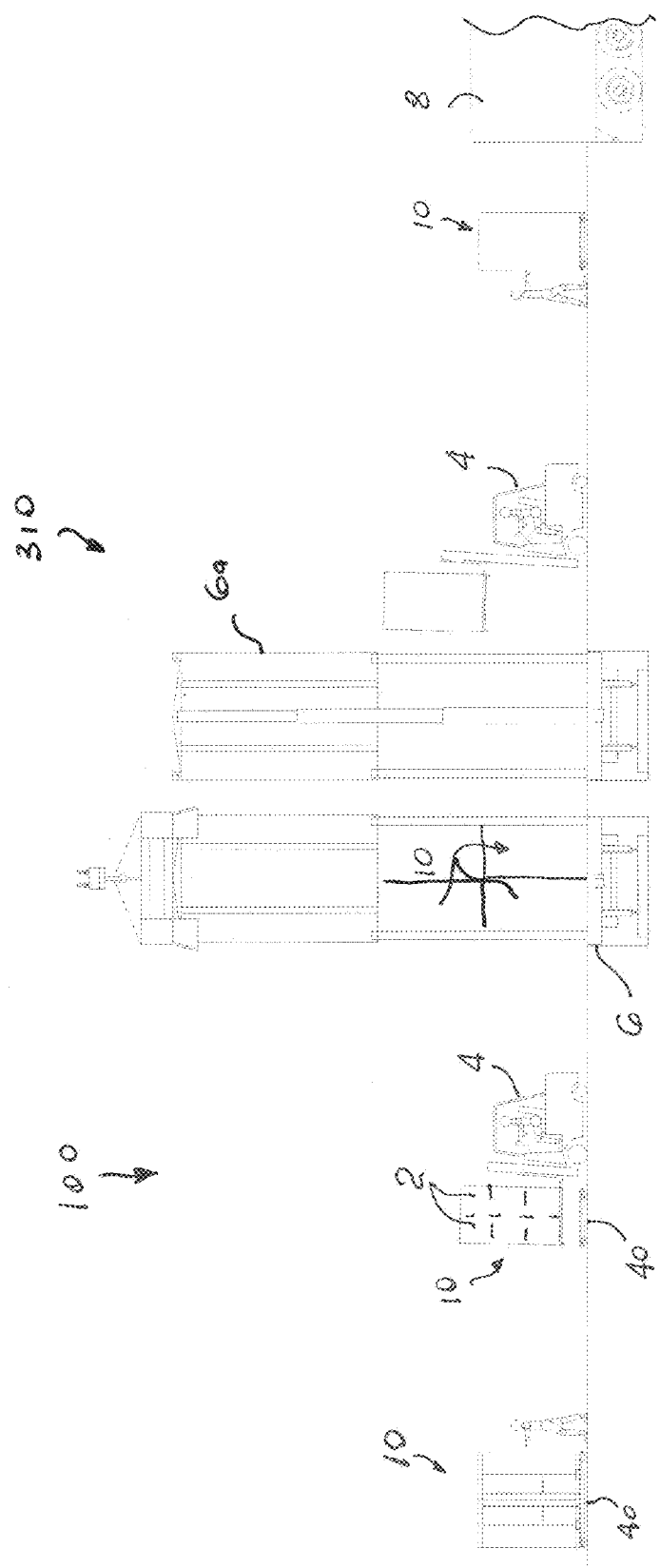

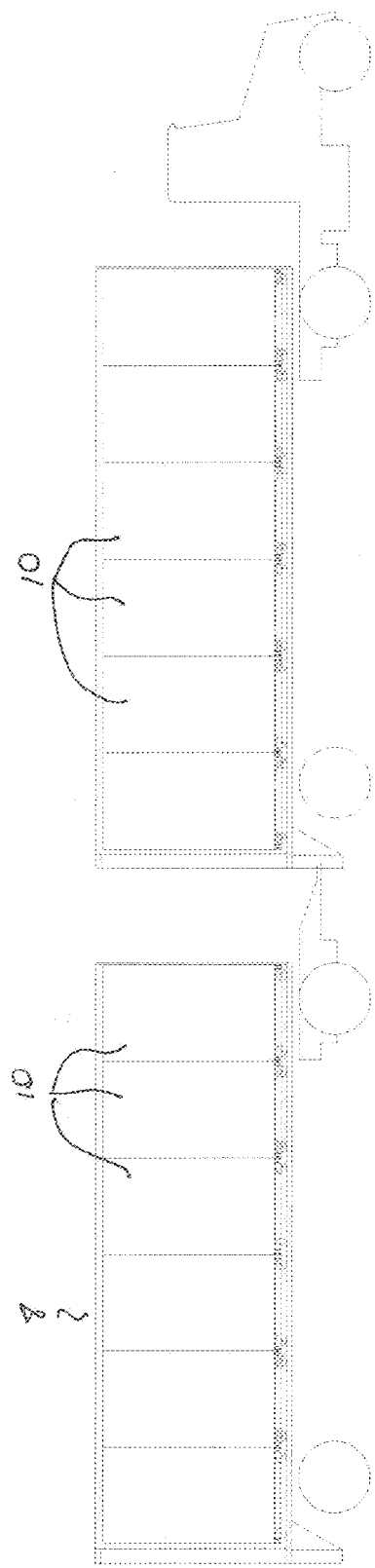
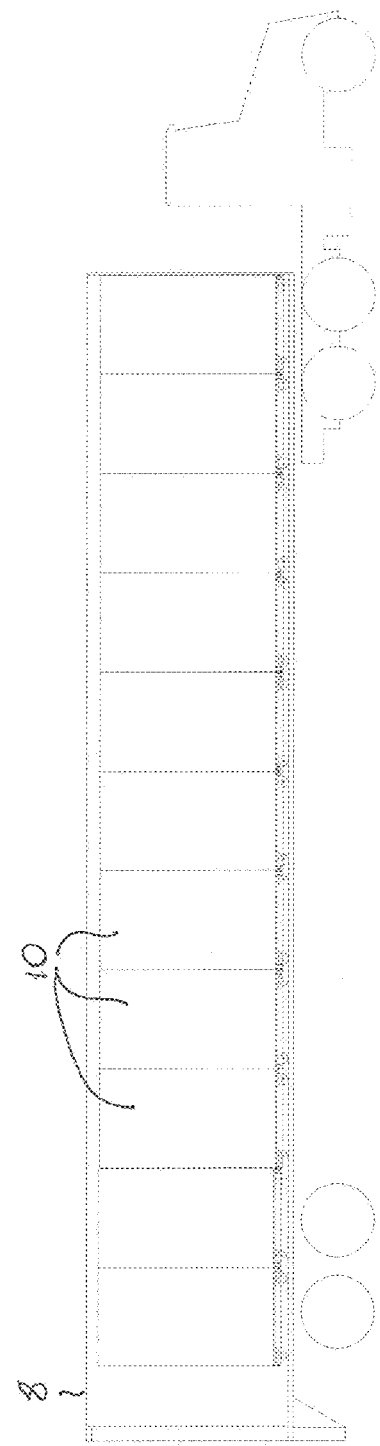
FIG. 7
FIG. 6

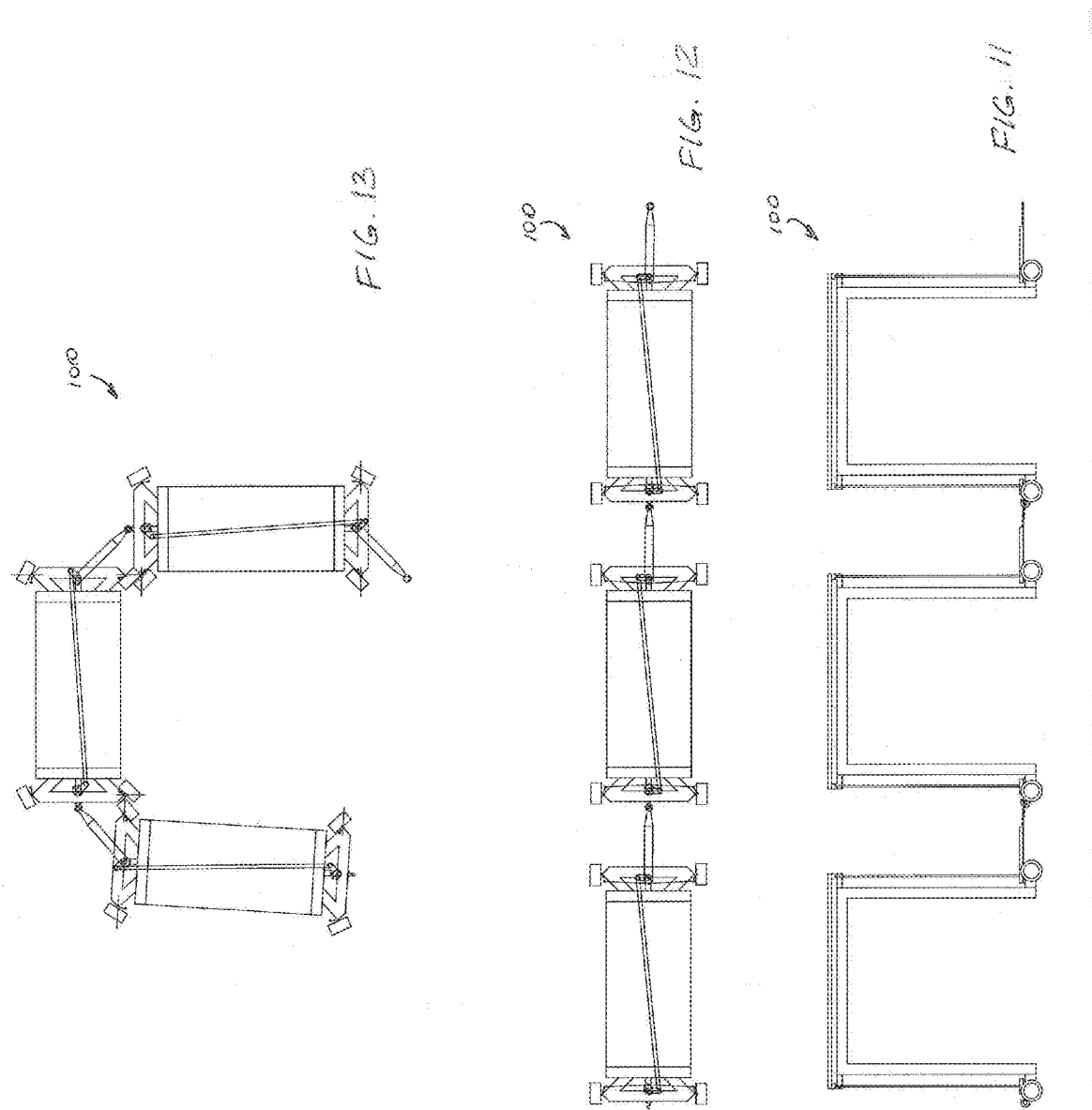

DEVICE, SYSTEM AND METHOD FOR GROUND LINE HAUL

CROSS-REFERENCE TO RELATED APPLICATIONS

This application is related to and claims priority from U.S. Provisional Patent Application Ser. No. 61/757,318 filed on Jan. 28, 2013.

FIELD OF THE INVENTION

The present invention relates, in general, to ground line haul and, more particularly, this invention relates to device, system and method for a ground transportation of articles and transfer of these articles between trailer and rail vehicles, including article transloading facilities.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, freight articles, such as parcels, are transported by rail and trailer type vehicles in what is commonly referred to as a ground line haul. More specifically, the parcels are being transported by a rail mode of operation for long distances and a trailer mode of operation for shorter, local distances. One essential feature of the ground line haul is a transfer of these parcels from/to rail and trailer vehicles. Another essential feature of the ground line haul is handling of the articles in a transloading facility. A further essential feature of the ground line haul is a space utilization of either rail or trailer vehicles. Prior to the conception and design of the instant invention, difficulties have been experienced in a cost efficient method of ground line haul operations due to higher than desirable efforts and equipment costs for loading/unloading of parcels and their transport between rail and trailer modes, i.e. modal exchange, including parcel transloading facility. Furthermore, it has been found that neither rail nor trailer vehicles were loaded to full available spatial/volume capacity, resulting in a wasted transport space. More specifically, an inefficient connectivity between modes results in a slow terminal velocity and high terminal operating cost. Inefficient use of equipment results in low ton/mile efficiency, low cube/linear foot ratios, inherent high cost with container/chassis in ground operations, poor usage of trailers on trailer-on-flat-car (TOFC) transportation mode, excessive fuel consumption, sustainability loss, restricted intermodal penetration by rail, not conducive to Hub-n-Spoke operations, and excessive "first mile" pick-up and "last mile" delivery (P&D) mileage by a truck trailer.

Underscored below are some of the current "operating standards" that Applicants found and/or believe as hindering intermodal efficiency of ground line haul.

The freight pallet, first used in the 1930's was designed to consolidate cargo onto a 12 sq/ft platform and still be small enough to enter doorways using a hand pallet jack. Today's pallets have remained relatively similar in size; however, the air freight industry has adapted a platform, the ULD (unit load device), with a footprint several times larger. This increase in the consolidation platform speeded terminal velocity allowing rapid turnaround of aircraft in hub-n-spoke operations measured in minutes. The ULD platform should be the "common denominator" in efficient transfer between truck and rail as well. Higher terminal velocity with quicker modal exchange at significantly lower operating cost subsequently bodes well for rail's ability to penetration intermodal operations deeper into the entire North American rail network.

The 40'ISO container dimension, 8'×40'×8', was established over 50 years ago as the standard for international shipping and at that time the average US highway trailer was similar in size. Today's trailer vansare as much as 48% larger, making the ISO container a poor capacity comparison forground movement. In addition, marine containers travel too far inland, causing excess cost in container inventories, chassis demand, maintenance and storage; equaling over 110 billion dollars annually.

The 53' domestic container is problematic for the trucking industry because the combined container/chassis tare weight is several thousand pounds heavier than a domestic trailer, restricting cargo density in order to comply with highway weight regulations. Basically, the container/chassis combination is a "two-piece trailer" requiring significantly greater capital investment cost with higher operational and maintenance expenditures than the domestic highway trailer. Lastly, the 53' container has been all but ignored as a practical container for marine transit and overseas land use.

The rail boxcar has much greater advantages both in cargo cube and weight capacities than the double-stack container car; however, the boxcar's fundamental design has remained virtually unchanged for 180 years. While boxcar capacity has improved somewhat; the side-door and loading dock access does not lend itself to efficient and speedy cargo exchange.

Current intermodal products, double-stack and trailer-onflat-car (TOFC) methods have the lowest ton/mile efficiency and capacity/linear foot ratios compared to all other types of unit trains. In addition, the large voids between double-stack railcars require 30% fuel consumption to overcome the high aerodynamic drag that it creates, among the highest drag ratios in the rail industry. Also, trailers riding on TOFC trains essentially idle thousands of trailers for road use daily, which is an inefficient use of equipment assets. A third service offering in ground intermodal is needed that will capitalize on rail's true assets: high train density and capacity.

Current North American intermodal rail terminals require high traffic volumes to cover their cost of operation and still yield a profit, which sharply limits the number of facilities within the network. As a consequence, intermodal rail is restricted to less than half of the available national rail network because of the operational necessity for huge facilities with high traffic volume. This has resulted in bottlenecks, predominately concentrated in large metropolitan markets, which bypass hundreds of smaller market opportunities. To date, there are only 64 locations throughout all of North America where railroads have clustered 101 terminals. Current rail intermodal service needs at least 650 miles of lane in order to absorb the terminal costs.

Truck pickup and delivery service (P&D) is the most costly mode in intermodal movement and under present practices have mileage requirements that are too long.

Therefore, there is a need for a device, system and method to improve the ground haul of freight articles and transfer of these articles between trailer and rail vehicles, including freight article transloading facilities.

There is a further need for incorporating unit load devices (ULD) as the basic pallet platform, speeding terminal throughput velocity, developing hub-n-spoke rail networks, raising intermodal train capacity, developing deeper rail penetration, creating zone skipping operations using rail intermodal transport, and improving predictability of ground line haul operations.

SUMMARY OF THE INVENTION

The invention provides device, system and method to improve a ground haul of freight articles and transfer of these freight articles between trailer and rail vehicles, including article transloading facilities.

In accordance with one embodiment, the invention provide a device for transporting freight articles in a ground or rail haul operations comprises a hollow housing including four corner sections, side walls, two center sections defining four openings each disposed between one edge of a center section and an edge of a respective corner section, a bottom portion and a top portion, wherein the two center portions are manufactured from see through or clear material. A door is mounted to selectively open and close a respective opening and swinging outwardly and towards a respective corner portion to selectively open the respective opening. Two channels are provided in the bottom portion, each in open communication with opposite sides of the bottom portion. Four feet or wheels are mounted on the bottom portion. Four receptacles are provided in the top portion, each sized and shaped to receive a foot therewithin.

In accordance with another embodiment, the invention provides a system or network for transporting freight articles by ground and/or rail haul modes. The system or network comprises a terminal configured to load or unload rail cars on one side and load or unload trailers on an opposite side thereof, one or more apparatuses including a U-shaped frame, wheels attached to each side of the frame, a tow bar pivotally attached to one side of the frame and a receptacle attached to an opposite side of the frame and configured to mate with a distal end of the tow bar, a linkage arrangement enabling turning and/or pivoting of the frame, one or more devices having a hollow interior and sized to be received within the U-shaped frame, and locking members attached to the frame and engageable with the device, the locking members operable to move the device in a vertical direction.

In accordance with yet another embodiment, the invention provides aA method for transporting freight articles by ground and/or rail haul modes, comprising the steps of loading the freight articles into standardized unit loading devices (ULDs), transporting the ULDs, by a truck trailer, between the facility and a receiving terminal configured for cross-docked operations wherein the truck trailer is loaded or unloaded at one side of the terminal and a rail car is loaded or unloaded at an opposite side of the terminal, loading the ULDs into the rail car, transporting the ULDs, by the rail car, between the receiving terminal and delivery terminal, unloading the ULDs from the rail car into another truck trailer or another rail car, and transporting the ULDs by the another truck trailer to an end destination or transporting the ULDs by the another rail to another terminal.

OBJECTS OF THE INVENTION

It is, therefore, one of the primary objects of the present invention to provide a device for transporting freight parcels.

Another object of the present invention is to provide a device for transporting freight parcels that incorporates wheels or a wheeled base for manual transport mode.

Yet another object of the present invention is to provide a device for transporting freight parcels that can be stacked in a vertical direction.

A further object of the present invention is to provide a device for transporting freight parcels that includes doors for selective access to the freight articles stored in the hollow interior of the device.

Yet a further object of the present invention is to provide an apparatus configured to lift and transport the above described device.

An additional object of the present invention is to provide an apparatus configured to lift and transport the above described device and that includes a U-shaped frame.

Another object of the present invention is to provide an apparatus configured to lift and transport the above described device and that includes a pivoting linkage arrangement and pivoting wheel arrangement enabling the apparatus to make a 90-degree turn.

A further object of the present invention is to provide a system for transporting the above described devices and apparatus in.

Another object of the present invention is to provide a method of transporting fright articles that utilizes a system of local, regional and hub rail terminals.

Yet another object of the present invention is to provide a method of transporting fright articles that employs a cross-docking terminal or transloading facility which is designed to handle rail vehicle on one side thereof and handle trailers on the opposite sides thereof.

A further object of the present invention is to provide a method of transporting fright articles that uses side loading/unloading freight box cars in a transloading facility allowing direct movement of freight articles to cross-docked trailers.

Another object of the present invention is to improve efficiency of intermodal rail terminals and to at least significantly reduce if not eliminate truck mileage requirements for "first and last mile".

A further object of the present invention is to provide simpler, faster and cheaper ground connectivity operations that shorten intermodal rail lanes and improve truck/rail connectivity.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a planar front/back elevation view of a device for transporting freight articles in a ground haul operations;

FIG. 2 is a planar top view of the device of FIG. 1;

FIG. 3 is a planar top view of a movable base employed in combination with the device of FIGS. 1-2;

FIG. 4 is a planar front/back elevation view of the base of FIG. 3;

FIG. 5 is a schematic diagrams illustrating transportation of the device of FIGS. 1-2 between rail and trailer modes and also within a facility configured to sort freight articles;

FIG. 6 illustrates devices of FIG. 1 loaded for transport within a single trailer;

FIG. 7 illustrates devices of FIG. 1 loaded for transport within a double trailer;

FIG. 11 is a front/back elevation view the system of FIG. 8 with devices of FIGS. 1-2 and/or bases of FIGS. 3-4 removed for clarity;

FIG. 12 is a planar top view of the system of FIG. 8 with devices of FIGS. 1-2 and/or bases of FIGS. 3-4 removed for clarity;

FIG. 13 is a planar top view of the system of FIGS. 8-9, showing turning capability of the system and devices of FIGS. 1-2 and/or bases of FIGS. 3-4 removed for clarity;

BRIEF DESCRIPTION OF THE VARIOUS EMBODIMENTS OF THE INVENTION

Figure 10:
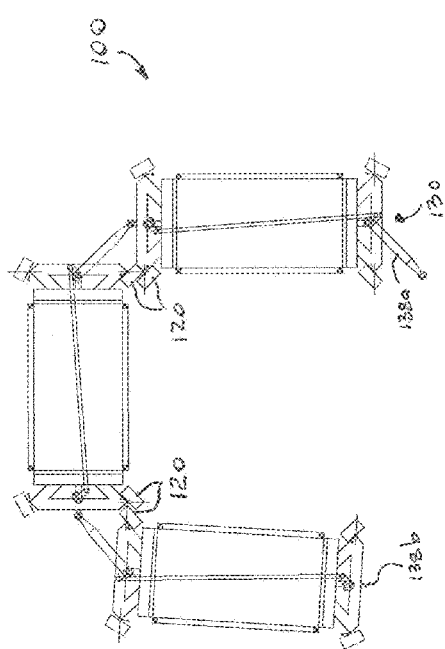
FIG. 10 is a planar top view of the system of FIGS. 8-9, showing turning capability of the system.

Prior to proceeding to the more detailed description of the present invention, it should be noted that, for the sake of clarity and understanding, identical components which have identical functions have been identified with identical reference numerals throughout the several views illustrated in the drawing figures.

The following definitions apply to the instant invention:

Unit Load Device (ULD)—Basic freight article, for example such as a parcel, containment platform for global intermodal operations.

Doorless Boxcar™—High capacity line-haul rail car with elevateable peripheral wall structure allowing loading/unloading of the freight articles from one or both sides of the rail car.

Transloading Terminal—High velocity modal exchange facility configured to load/unload rail cars on one side and load/unload trailers on an opposite side.

Integrated Processes—Unified operations supported by information technology.

FIG. 1 is a front/back elevation view and FIG. 2 is a planar top view of a device, generally designated as 10, configured to transport freight articles 2 in a ground and/or rail haul operations. The device 10 may be referred to as the Unit Load Device (ULD). The device 10 includes a housing 12 having, in a presently preferred embodiment, a hollow interior, four corner sections 14 that may be also connected by optional side walls 18. The four corner sections 14 may be provided as conventional corner posts. There are also two center sections 16 defining four openings 17, each disposed between one edge of a center section 16 and an edge of a respective corner section 14. Two doors 20 are mounted on each front and back of the housing 12 to selectively open and close a respective opening 17 and swinging outwardly and towards a respective corner portion 14 to selectively open the respective opening 17. Center sections 16 which may be manufactured from see through or clear material, such as Plexiglas, for viewing the contents of the device 10 without the need to open doors 20. Although the doors 20 are shown as a swing doors in FIG. 2, they may be of a bi-fold or linear sliding type or even a configuration of netting to secure the parcels 2 within the hollow interior of the housing 12. The doors 20 can be adapted with conventional handles 21 and locking devices 21a so as to reduce damage and pilferage of the freight articles 2.

The housing 12 also includes a bottom portion 22 defining the floor of the housing 12 and also containing a pair of channels 24, each in open communication with opposite sides of the bottom portion 22, configured for interface with the forks of the fork lift truck 4. Bottom portion 22 may be further adapted to carry four optional corner feet 26, each mounted on the bottom portion 22 at a respective corner thereof.

Additionally, the housing 12 defines a top portion 28 with an optional four receptacles 30, each provided at a respective corner thereof, each sized and shaped to receive a foot 26 when two devices 10 are stacked in a vertical direction.

FIG. 3 is a planar top view and FIG. 4 is a front/back elevation view of an optional mobile base 40 employed in combination with the device 10 of FIGS. 1-2. The base 40, defining a hollow interior of the base and four edge surfaces, is sized to receive the bottom portion 22 of the device 10 thereon or therewithin, for example by way of a lip or lips 44 and adapted with wheels 42 for ease of movement, by manually applied force, of the device 10. Four optional receptacles 30 may be also provided in the base 40, each disposed at a respective corner of the base 40 in an open communication with a top surface thereof and being sized and shaped to receive a foot 26 of the device 10 adapted with the four feet 26. It is also within the scope of the instant invention to attach the wheels 42 directly to bottom portion 22, corner sections 14 or sides 18 of the housing 12 for ease of manual maneuvering.

Preferably, a size of the device 10 is large enough so as to reduce handling and facilitate common processing of freight articles 2 and, further the size is universal to fit within all transport equipment and storage systems. The instant invention contemplates that provisions to stack devices 10 in a vertical direction, by way of feet 26 and receptacles 30 maximizes capacity of transport vehicles and/or storage facilities and transloading terminals/.

Furthermore, an optional RFID tag 38, attached to any exterior surface of the device 10, provides for in-transit visibility and optimizes routing logistics.

The instant invention further contemplates that the device 10 may be provided of a collapsible type, where the corner sections 14, center sections 16, side walls 18 portions and doors 20 can be detached from the bottom portion 22 and top portion 28 for backhaul efficiency.

Ease of handling and moving the device 10 either manually or with material handling equipment simplifies and speeds up cross-docking operations.

FIG. 5 is a schematic diagrams illustrating transportation of the device 10 of FIGS. 1-2 between rail and trailer modes and also within a facility configured to sort freight articles. Specifically, it illustrates unloading the device 10 from the rail car 6 onto the base 40 with the fork lift truck (or any other suitable material handling device) and then manually moving the device 10 with the base 40 to the parcel processing area (not shown) or for loading into the trailer 8.

FIGS. 6 and 7 illustrate devices 10 of FIG. 1 loaded for transport within a single trailer 8 of FIG. 6 or double trailer configuration of FIG. 7.

Figure 9:
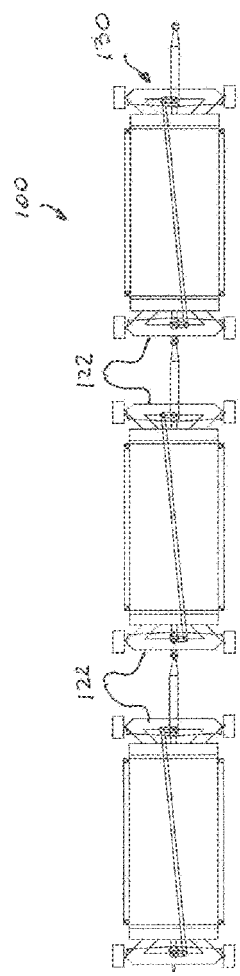
FIG. 9 is a planar top view of the system of FIG. 8.
Figure 8:
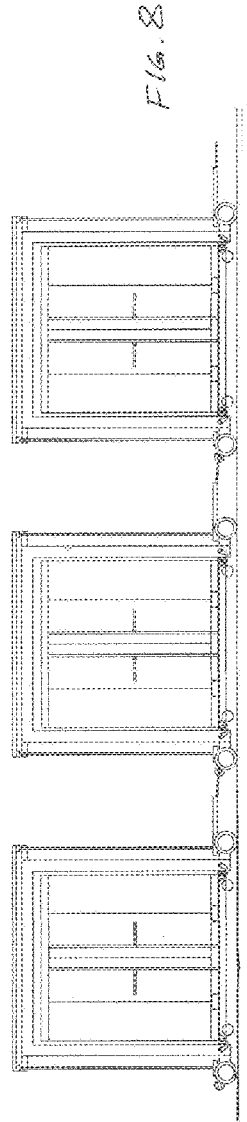
FIG. 8 is a front/back elevation view of one system for transporting devices of FIGS. 1-2 and/or bases of FIGS. 3-4.
Figure 17:
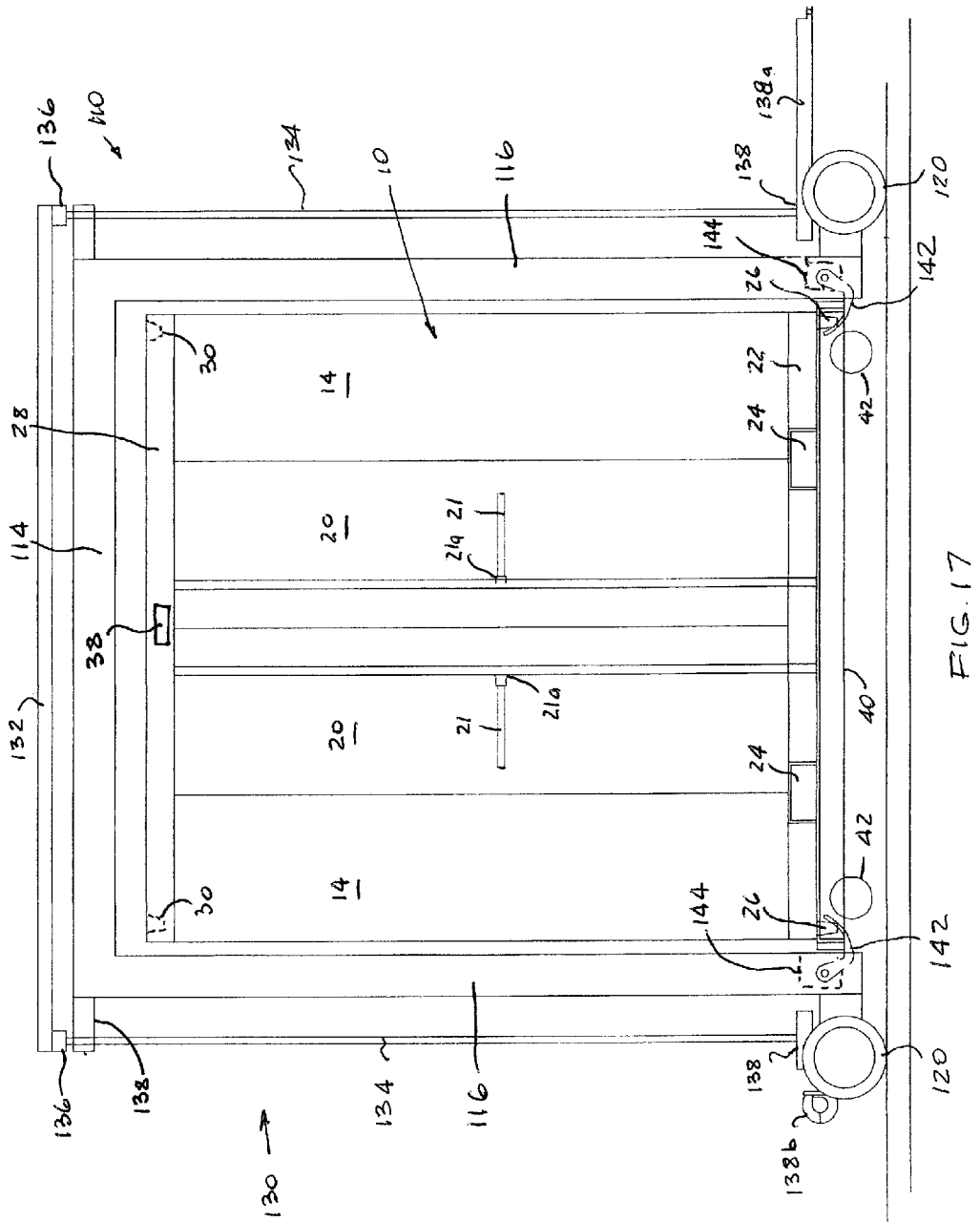
FIG. 17 is an enlarged front/back elevation view of the system of FIG. 8 in a single apparatus configuration.

FIGS. 8-9 illustrate, respectively, a front/back elevation view and a planar top view of a system, generally designated as 100, for transporting devices 10 of FIGS. 1-2 with or without bases 40 of FIGS. 3-4. Specifically, the system 100 includes an apparatus, generally designated as 110, and best shown in FIGS. 17-18, and defining a chassis or frame 112 that includes a top member 114 and two side members 116 defining, in a combination with each other, a generally U-shaped construction of the frame 112, as best shown in FIG. 17, sized to receive the housing 12 of the device 10 therewithin. Two wheel axles 122 are provided, each attached to a lower end of a respective side member 116 of the frame 112. The frame 112 is supported by wheels 120 mounted on the ends of the wheel axles 122 in a pivotal connection, including pivoting wheel link members 124 and 126.

There is also a linkage arrangement, generally designated as 130, that includes a horizontally disposed member 132, a pair of vertically disposed members 134, a first pivotal connection, by way of pivoting member 136, between each end of the horizontally disposed member 132 and an upper end of each vertically disposed member 134 so that the horizontally disposed member 134 pivots in a horizontal plane. The frame 110 also includes lower attachments. One of the lower attachments is a tow bar 138a and another one is a receptacle 138b. Tow bar 138a has a distal end thereof connected in a second pivotal connection with the frame 112 and having a distal or free end thereof configured to mate with the receptacle 138b of another frame 112 so as to attach apparatuses 100 in series with each other to form a consist for transporting plurality of the devices 10. The first and second pivotal connections enable a pivotal movement or a turn of the frame 112 relative to another frame 112 being coupled to the frame 112 in series therewith. Further, the linkage arrangement 130 and the wheel members 122 are so configured and size that apparatus 110 is capable of easily making a sharp 90 degree turn, when plurality of apparatuses 110 are mounted in series with each other, as best shown in FIG. 10.

The main purpose of the apparatus 110 is to transport the device 10 elevated above the ground surface even when such device is positioned on the base 40. Accordingly, the apparatus 110 includes four locking members 142 that are mounted for a pivotal movement at each lower corner of the side member 116 of the frame 112 adjacent a bottom end thereof and that are pivoted by either electrical, pneumatic, hydraulic or manually operable mechanism 144 for raising or lowering the device 10. During pivoting movement, the locking members 142 engage a bottom portion 22 of the housing 12 or the side edges of the base 40.

FIG. 11-13 are, respectively, a front/back elevation view and a pair of planar top elevation views of the system of FIGS. 8-10 with the devices 10 of FIGS. 1-2 and/or the bases 40 of FIGS. 3-4 removed for clarity.

Figure 16:
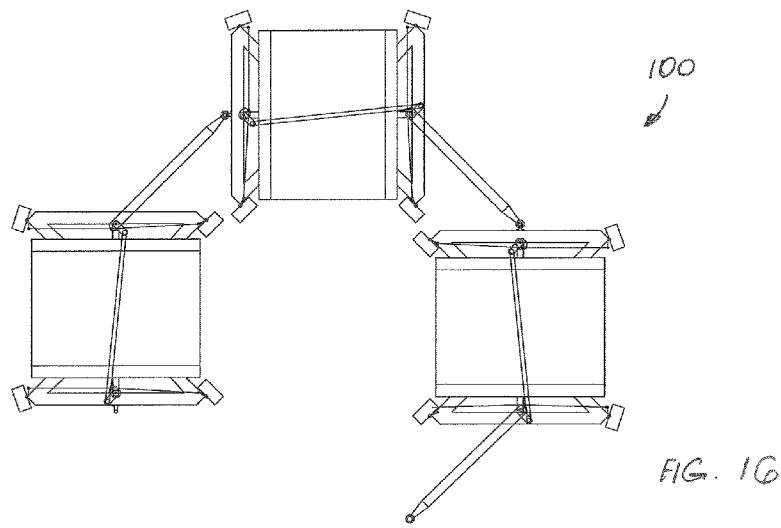
FIG. 16 is a planar top view of the system of FIGS. 11-12, showing turning capability of the system.
Figure 15:
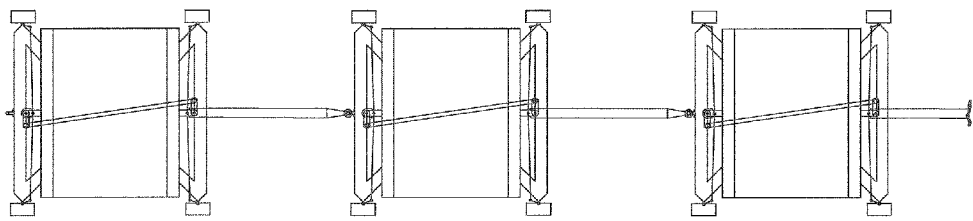
FIG. 15 is a planar top view of the system of FIG. 11.
Figure 14:
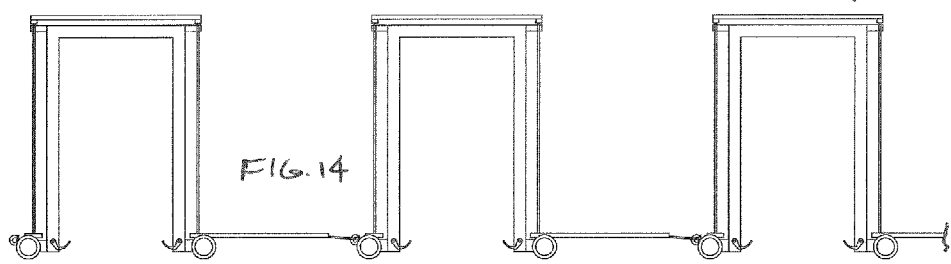
FIG. 14 is a front/back planar elevation view of another system for transporting devices of FIGS. 1-2 and/or bases of FIGS. 3-4 removed for clarity.

FIGS. 14-16 illustrate set of views of another system configuration for transporting the devices 10 of FIGS. 1-2 and/or the bases 40 of FIGS. 3-4 rotated 90 degrees in relationship to the system 100 of FIGS. 8-10 with the devices 10 and/or the bases 40 of FIGS. 3-4 removed for clarity.

Figure 18:
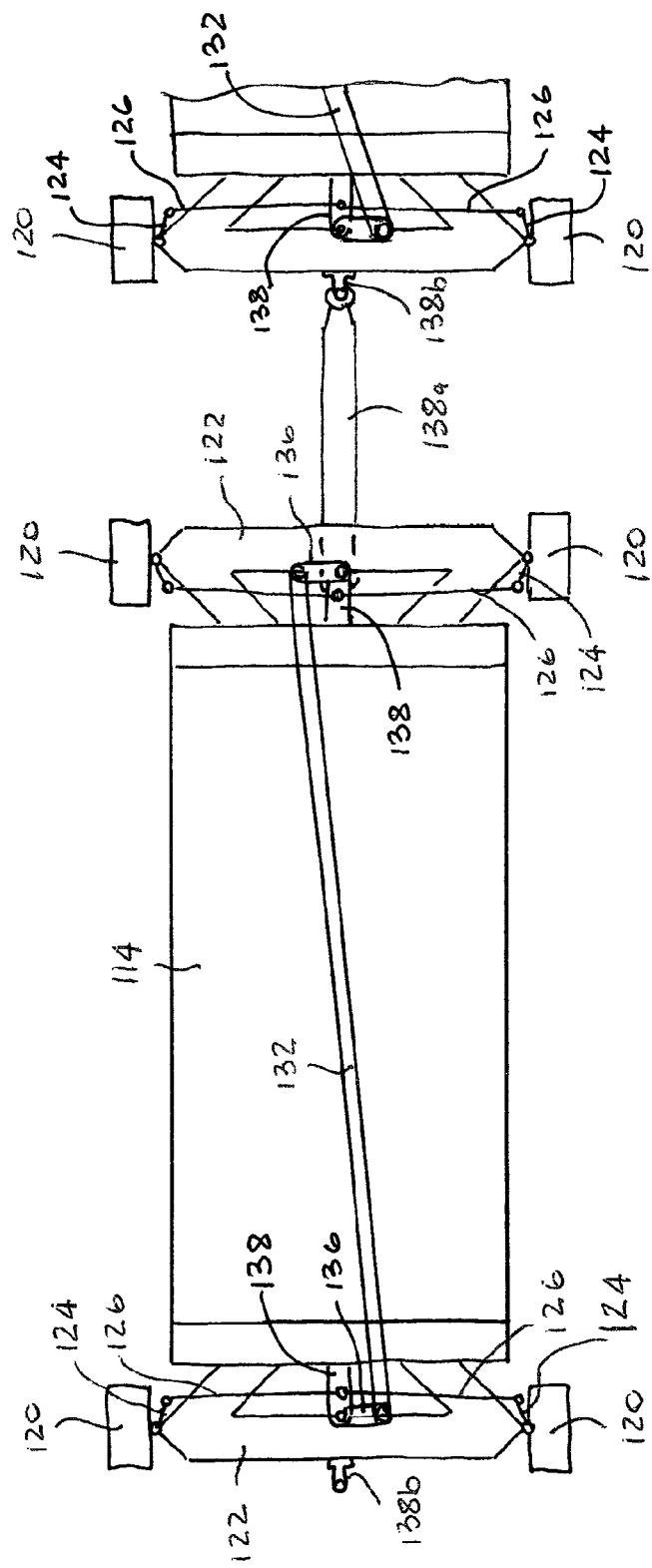
FIG. 18 is a top planar view of the apparatus of FIG. 17.

FIG. 17 is a front/back elevation view and FIG. 18 is a planar top view, respectively, of the single apparatus 110. As it has been described above, it is within the scope of the instant invention to integrate features of the base 30 and, particularly wheels 42, with the device 10 by attaching such wheels 42 directly to bottom portion 22 or sides of the housing 12. The locking members 142 are then configured to lift the device 10 at its bottom side edges and lock, for example by way of the mechanism 144, the device 10 in such lifter position. It is also contemplated to stack a pair of the devices 10 with integral wheels 42 in a vertical direction, one top the other, either with the wheels 42 of the top device 10 abutting top portion 28 either directly or fitting within special receptacles or protrusions (not shown) provided in such top portion 28.

As a skilled worker would clearly understand from disclosures of FIGS. 8-17, the apparatus 110 allows the device 10, equipped with wheels 42, to be manually rolled into a position within the frame 112 and lifted off the ground by the locking devices 142 for transport without the necessity of special mechanical material handling devices, such as dollies, pallet jacks or fork lift trucks within the parcel terminal sorting and dock handling operation, for example such as a hub terminal 300 or a spoke terminal 310, described in more details below. Thus, the concept of transporting devices 10 differs from air freight handling operations, where the containers must be mechanically lifted or placed on roller platforms for movement within the airport grounds. Furthermore, the devices 10 of the instant invention can be individually moved/transported, where the air freight containers can only be transported on a wagon platform, special lift transport device or roller conveyors. Finally, the devices 10 of the instant invention can be stacked one on top of another, wherein the air freight containers are not.

Apparatus 110 further allows for ease of freight articles 2 transport within a facility of origin (not shown) of such articles 2 or and end (user) destination (not shown).

The instant invention contemplates that all devices 10, in a multi frame configuration consist, may be lifted from a control location or the operator cab (not shown) by connecting all locking devices 142 from a single control/power source (not shown).

The instant invention further contemplates that the apparatus 100 may be employed with other open or closed type devices provided for storing a plurality of freight articles 2 therewithin or thereon, for example, such as a conventional carts, pallets, baskets and the like.

By way of examples only, such devices can be of the type as illustrated and described in a utility patent application Ser. No. 13/238,077 titled "UNIT LOAD DEVICE AND CONTAINER FOR TRANSPORTING CARGO", filed on Sep. 21, 2011 and published on Mar. 22, 2012 as US Pub. No. 2012-0067884 A1 published, U.S. Pat. No. 6,602,032 B2 issued to Arai on Aug. 5, 2003 and U.S. Pat. No. 7,350,662 B2 issued to Arnold on Apr. 1, 2008. Teachings of the US Pub. No. 2012-0067884A1, U.S. Pat. No. 6,602,032 B2 and U.S. Pat. No. 7,350,662 B2 are incorporated herein by reference thereto.

Figures 19, 20:
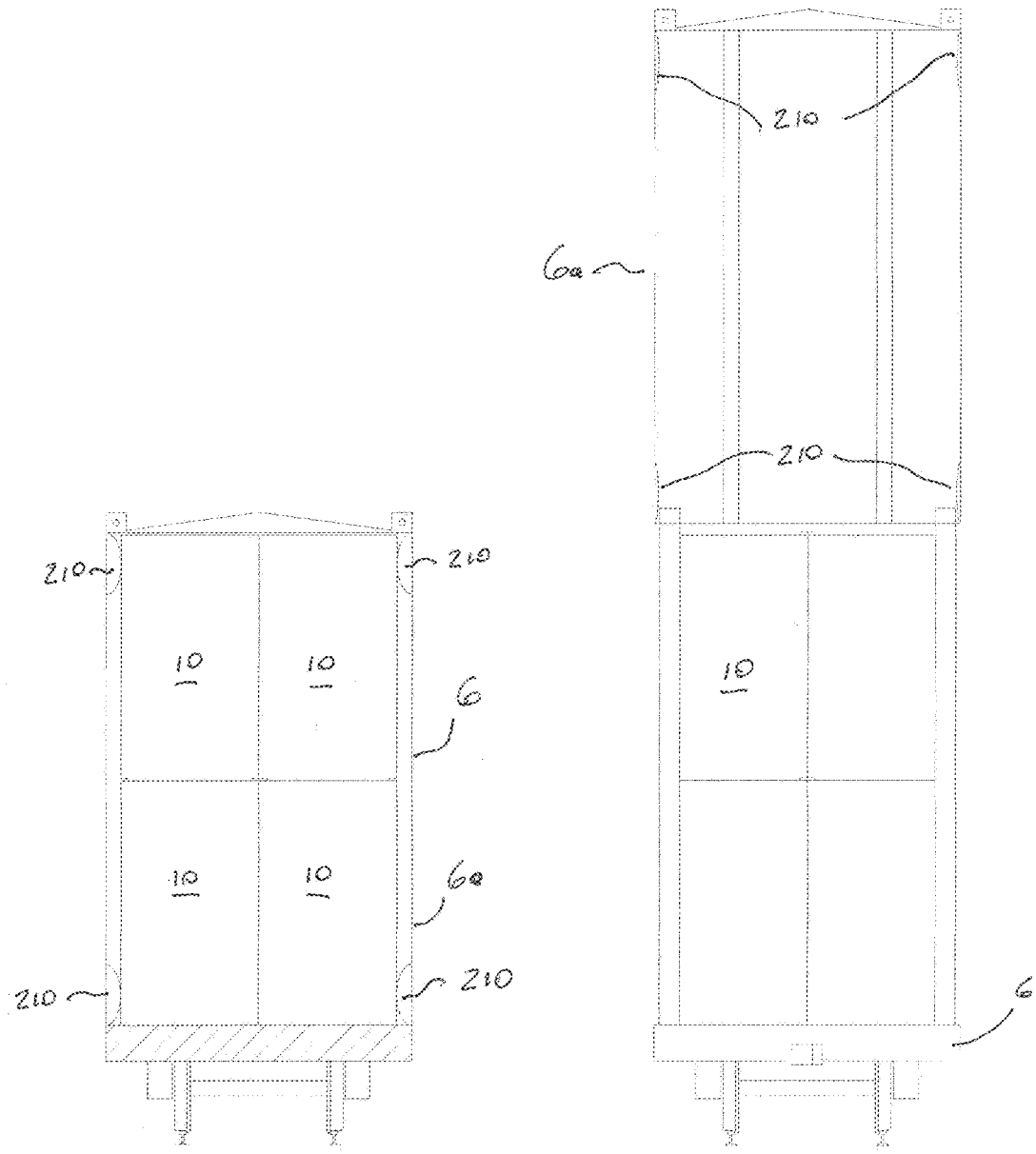
FIG. 19 is an end elevation view of the rail vehicle containing devices of FIGS. 1-2 and protective structure in a lowered normal position.
FIG. 20 is an end elevation view of the rail vehicle containing devices of FIGS. 1-2 and protective structure in a raised position for loading/unloading purposes.

FIG. 19 is a planar end elevation view of the rail vehicle 6, such as doorless box car, configured for transporting device 10 of FIGS. 1-2 and protective structure 6a in a lowered normal position. FIG. 19 is a planar end elevation view of the rail vehicle 6 configured for transporting devices 10 of FIGS. 1-2 and protective structure 6a in a raised position for loading/unloading purposes. Also shown in FIGS. 19-20 is system of bladders or other compressible resilient members 210 configured and operable to prevent lateral movement or swaying of the devices 10 positioned for transport within the rail vehicle 6. By way of one example only of FIGS. 19-20, such compressible resilient members are illustrated as conventional bladders. FIG. 19 illustrates bladders 210 in the inflated position, while FIG. 20 illustrates bladders 210 in the deflated position for loading unloading purposes. Bladders 210 can be actuated by compressed air system (not shown) conventionally found on rail vehicles 6 or by auxiliary air or hydraulic systems (not shown) configured to operatively couple to the bladders 120. Instant invention also contemplates that the compressible resilient members 210 may be alternatively attached to sides of the device 10. By way of one example only, the bladder shaped member 210, when attached to the sides of device 10 will be compressed by the protective structure 6a when the devices 10 are loaded onto the rail car 6 and when the protective structure 6a is lowered into a normal position. Such compression prevents lateral movement or swaying of the devices 10. When the protective structure 6a is lifted, the bladder shaped members 210 expand outwardly into an uncompressed position.

Tracks or other inclusions (not shown) can be provided within the floor of the rail vehicles 6 for alignment purposes. The embodiments of FIGS. 19-20 are also applicable for trailers 8. Furthermore, in another example, the floor of the rail vehicle 6 or the trailer 8 may be adapted with the above described receptacles 30 to receive the feet 26 of the device 10.

Figure 21:
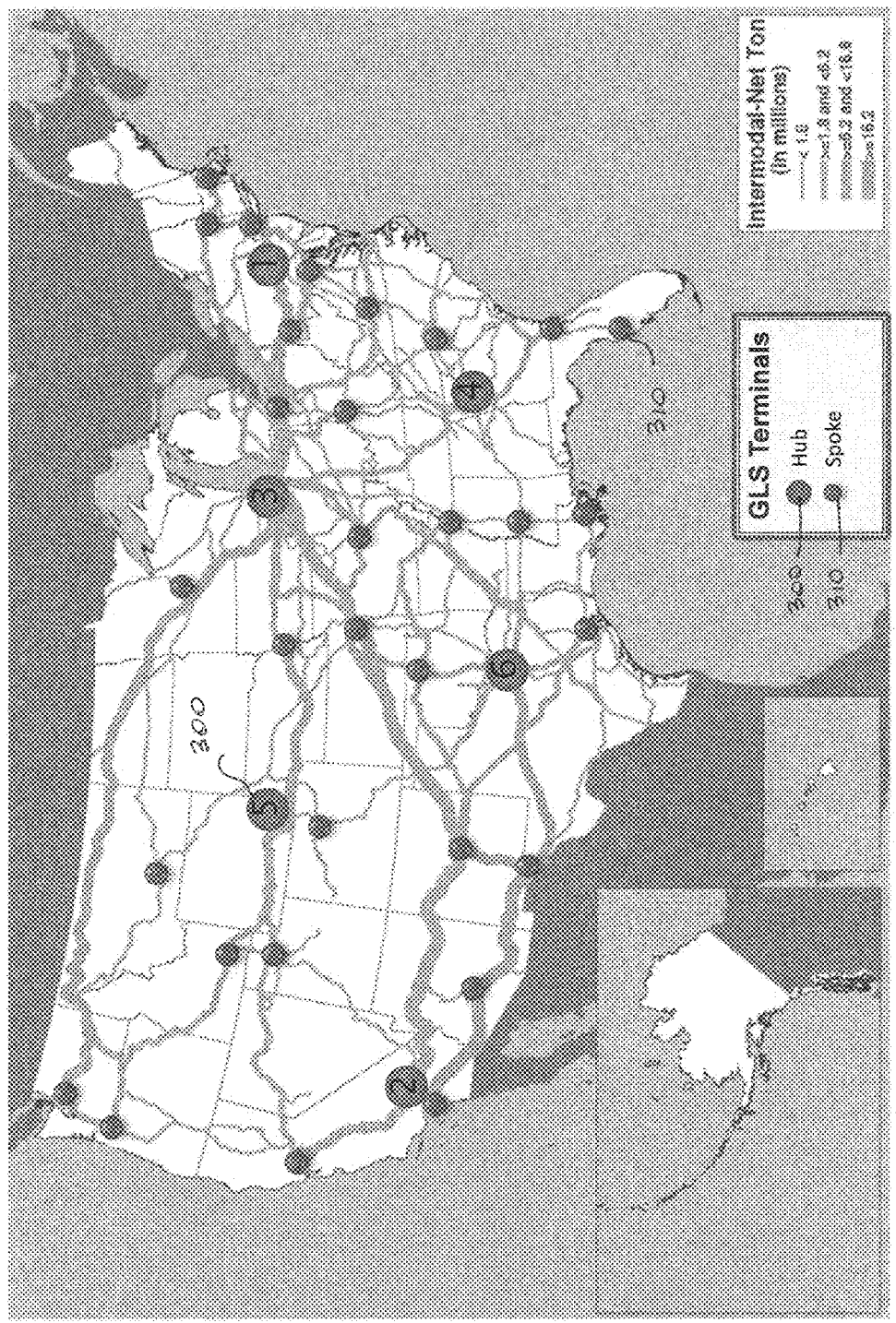
FIG. 21 illustrates a diagram of geographical locations of rail terminals within the territory of United States for use in transporting devices of FIGS. 1-2.

Finally, FIG. 21 illustrates a diagram of a global line service (GLS) network with geographical locations of rail terminals within the territory of United States for use in transporting devices 10 of FIGS. 1-2. Specifically, it is contemplated to provide the GLS network as having hub type terminals 300 and spoke type terminals 310. The number and locations of these terminals is represented based on an intermodal capacity shown in FIG. 21, as provided by the U.S. Department of Transportation figures for 2008. However, the specific quantities and locations can be adjusted based on changes in transportation patterns and/or distribution needs. For example, a spoke terminal 310 can be upgraded to a hub terminal 300 if the volume is sufficient to support such upgrade. At the same time, it is contemplated herein that the instant invention may change the volume patterns, where the presently shown hub terminal 300 can be downgraded to the spoke terminal 310.

It is also contemplated herein that each hub terminal 300 is directly linked with a predetermined number of spoke terminals 310.

By way of one example only, method of using the rail network concept of FIG. 21 starts at a facility of origin, for example such as a manufacturing plant, distribution center, warehouse, etc, where freight articles 2 are consolidated and loaded into the above described ULDs 10. RFID routing instructions are registered by the RFID tag 38 providing product information and shipping instructions to include the destination terminal (regional hub, spoke terminal, zone, zip code, complete shipping instructions etc.). The ULDs 10 are loaded into trailers 8 and transported to the spoke terminal 310 for cross-docking into railcars 6. At the spoke terminal 310, trailers 8 are docked at designated bay locations on one side of the terminal spoke 310 and ULDs 10 are cross-docked from trailers 8 into specific destination railcars 6 that are parked on the opposite side of the spoke terminal 310 and that are RFID coded by railcar ID and are further coded by in "block" identification, wherein a block is a series of adjacently coupled railcars 6 bound for the same location, for example another spoke terminal 310 or hub terminal 300. Each ULD 10 is removed from the trailer 8 and transported according to RFID information. As best shown in FIG. 5, the design of the ULD 10 allows for half of the ULDs 10 to go to a station where side supports are installed for placement on the floor of a railcar, after which they are moved to a designated railcar 6 and are placed on a designed section on the floor of the railcar 6. The other half of the ULDs 10 is moved directly to the designated railcar 6 for top-stacking at a designated section atop a floor loaded ULDs 10. A sprint train (not shown) then line hauls the blocks of cars to a regional (departure) hub, that could be either the above referenced spoke terminal 310 or even a hub terminal 300.

At the regional (departure) hub, a rail switching operation collects the throughput railcar blocks onto specific departure tracks for further line haul movement to the various hub (arrival) terminals 300 throughout the network. Partially loaded railcars 6 are docked and ULDs 10 are transloaded for carload consolidation to specific destinations and then moved to the appropriate departure track for interregional line haul destinations. When required for local freight deliveries, railcars 6 are docked at the terminal 300, 310 and ULDs 10 are cross-docked from the railcars 6 into trailers 8 for last mile delivery.

At the regional (arrival) hub, that could be either the above referenced spoke terminal 310 or even a hub terminal 300, the sequence from the railcar 6 to the trailer 8 is in a reverse of the above sequencing, with freight and parcels collated by regions, zones and zip codes. Specifically, inbound "blocks" are collected and switched to specific departure tracks for sprint train movement to specific spoke destination terminals 310. For local freight deliveries, railcars 6 are docked for cross-docking ULDs 10 from the railcars 6 into trailers 8, docked in designated bays, for last mile delivery.

The instant invention contemplates that the ULDs 10 can be loaded directly into the railcar(s) 6 at facilities equipped with a rail access. In this case, the railcars 6 will be line hauled either to the spoke terminal 310 for inclusion into a train consist with other railcars 6 or even to the hub terminal 300 when the number of the railcars 6 loaded at the facility of origin is sufficient to form a stand-alone train consist for independent line haul movement.

The instant invention also contemplates that such train consist can be line hauled directly to an end user, thus bypassing the above described intermediate operations and further eliminating last mile delivery by trailer 8.

The method also contemplates use of hybrid line haul, where select high volume lanes can be blocked for direct train movement between nodes, such as direct interregional between a hub and spoke terminal, 300 and 310 respectively, direct interregional between two spoke terminals 310, and direct intraregional between two spoke terminals 310.

The method further contemplates that a specific region can have more than one hub terminal 300 to accommodate a greater volume, and/or expedite and streamline delivery of the fright articles 2. Factors that are considered here include initial processing at point of origin, final processing at point of destination and mid-haul switching or transloading at a specific hub 300. The mid-haul switching or transloading can be accommodated with one of two methods: railcar through passage as is (full or partially loaded railcars) or movement of freight articles 2 from one railcar to another. Thus, the components of the above described network include one or more hub terminals 300, one or more spoke terminals 310 being linked directly with one hub terminal 300, entry handling at the origin facility of freight articles 2, railcar through passage as is (mid-haul switching), transloading (mid-haul switching) and exit handling at a destination facility, for example such as a manufacturing plant, distribution center, warehouse, etc, where the freight articles 2 are unloaded for use in a manufacturing process or delivery to individuals. Each of the above components are then assessed for action steps, labor time, duration, dwell time, and capital item requirements (identification and unit quantification, but not cost quantification).

The results of these assessments can then be combined to determine proper number and locations of the spoke terminal 310 and hub terminals 300. It is anticipated that the above described network and method improves financial performance of the conventional line haul mode using TOFC and/or double-stacked trailers.

It would be understood that the design and use of cross-docking terminals simplifies and speeds up exchange between rail and truck modes, reduces costs on expensive terminal equipment and labor; reduces dwell time and drayage costs, requires a smaller terminal footprint with a lower cost to materialize, provide multiple choices for terminal sites that best compliment local demographics and infrastructure; allow deeper penetration by rail, thus reducing truck P&D and reduce fright article/parcel terminal handling and sorting logistics.

The instant invention provides a unique integration of facilities, transport equipment and processes increasing capacity, velocity and reach while reducing cost and time. It further places parcels 2 in a constant, uninterrupted state of flow.

The instant invention has the following advantages for transportation and delivery of the freight articles 2:

- Standardized container device to facilitate common processing
- Collates mixed class parcels by region, zone and zip code
- Simplifies and speeds transport loading
- Sized to fit in all transport equipment
- Stackable to maximize train line haul capacity
- Securable to reduce damage and pilferage
- RFID equipped for routing instructions and transit visibility
- Optional wheel design for manual maneuvering The instant invention has the following advantages for Doorless Box Car 6 described in US Pub. No. 2011/0299970 A1 published on Dec. 8, 2011, whose teachings are incorporated herein by reference thereto:

- Jumbo sized
- Elevating superstructure
- Reduces aerodynamic drag
- GPS equipped for tracking, routing, switching
- Replaces TOFC operations, improving trailer utilization and inventory
- Eliminates need for containers and chassis
- Highly securable
- Conducive to rapid Hub-n-Spoke sprint train operations The instant invention has the further following advantages for Transloading Terminal:

- Cut terminal handling and transloading, saving time and cost
- Reduce dwell for higher terminal velocity
- Eliminate the need for high cost terminal equipment
- Require a much smaller land footprint, improving location opportunities
- Allow deeper penetration by intermodal rail.

The instant invention also contemplates linking the above described methodology and components with information technology (IT) visibility to create a more intelligent transport system with greater efficiency and speed while cutting costs, amplify opportunity for intermodal growth, permit in-transit routing flexibility, decrease handling, provide door-to-door service comparable to trucking with lower cost than current intermodal service.

It has been found that as intermodal traffic increased, present inland rail terminals have been built that in many ways mimic the marine terminals, i.e. highly specialized operations requiring huge capital investments to construct, equip and maintain. For ground intermodal this conventional/existing operating model requires complicated and slow modal exchanges that lack flexibility, prohibiting rail intermodal expansion into smaller market locations along main rail lines and secondary lines alike. Applicants found that the key to successfully expanding ground intermodal flow is more numerous, nimble and strategically dispersed truck/rail connectivity points that are relatively inexpensive to materialize and simple to operate. The instant invention of the GLS network, coupled with novel transloading method and incorporation of novel ULDs 10 and apparatuses 110 modernizes the ground haul logistics industry so as to efficiently connect door-to-door shipping into a simpler, faster, cheaper and cleaner way of moving freight articles 2.

Although, the GLS network of FIG. 21 has been illustrated and described as a land based network, the instant invention contemplates inclusion of marine operations, particularly updated to transport device 10 with or without apparatuses 110.

To improve efficiency marine containers should operate strictly within a short radius between the port and near-port transloading facilities.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A device for transporting freight articles by ground and/or rail haul modes, comprising:
    (a) a housing including four corner sections, side walls connecting said four corner sections, two center sections defining four openings each disposed between one edge of a center section and an edge of a respective corner section, a bottom portion and a top portion, all defining a hollow interior of said housing, wherein said two center portions are manufactured from see through or clear material;
    (b) four doors, each mounted to selectively open and close a respective opening and swinging outwardly and towards a respective corner portion to selectively open said respective opening;
    (c) two channels provided in said bottom portion, each in open communication with opposite sides of said bottom portion;
    (d) four feet or wheels, each mounted on said bottom portion at a respective corner thereof; and
    (e) four receptacles, each provided in said top portion at a respective corner thereof, each sized and shaped to receive a foot therewithin.

2. The device of claim 1, further comprising a base defining a hollow interior of said base and four edge surfaces, four wheels, each attached to a respective corner of said base, four receptacles, each provided at said respective corner of said base in an open communication with a top surface thereof and being sized and shaped to receive a foot of said device adapted with said four feet.

3. The device of claim 1, further comprising compressible resilient members attached to one or both sides of said device.

4. The device of claim 1, further comprising:
    (a) a frame including a top member and two side members defining, in a combination with each other, a U-shaped configuration of said frame, said U-shaped configuration being sized to receive said housing therewithin;

(b) two wheel axles, each attached to a lower end of a respective side member of said frame;

(c) four wheel members, each attached to an end of one of said two axles with pivoting link members for pivoting about a horizontal plane;

(d) a linkage arrangement including a horizontally disposed member, two vertically disposed members, each supported by a pair of support members attached, in a vertical spaced-apart relationship with each other, to one side of said frame, a first pivotal connection between each end of said horizontally disposed member and an upper end of each vertically disposed member so that said horizontally disposed member pivots in a horizontal plane, a tow bar, a second pivotal connection between a proximal end of said tow bar and a lower support member at one side member of said frame, and a receptacle attached to one axle at an opposite side member of said frame, said receptacle is configured to couple with a free distal end of another tow bar; and (e) said linkage arrangement enabling a pivotal movement or a turn of said frame relative to another frame being coupled to said frame in a serial arrangement therewith.

5. The device of claim 4, further comprising four locking members mounted for a pivotal movement at each lower corner of said side member and shaped to engage a bottom portion of said housing, said four locking members operable to move said housing in a vertical direction.

6. The device of claim 1, further comprising a base having lip(s) and sized to receive said bottom portion of said housing thereon or therewithin.

7. The device of claim 4, wherein said each wheel axle includes tapered ends configured, with said pivoting link members, to orient, at an angle, a pair of wheels at each axle allowing a ninety (90) degree turn of said device mounted, by way of said tow bar and/or receptacle in series with other device(s).

8. The device of claim 4, wherein said pivoting link members includes a pair of first link members having one end thereof in a pivotal connection with a respective wheel and a pair of second link members having one end thereof in a pivotal connection with a lower support member and having an opposite end thereof in a pivotal connection with an opposite end of said first link member.

9. The device of claim 1, further comprising:

(a) a frame including a top member and two side members defining, in a combination with each other, a U-shaped configuration of said frame, said U-shaped configuration being sized to receive said housing therewithin;

(b) two wheel axles, each attached to a lower end of a respective side member of said frame;

(c) four wheel members, each attached to an end of one of said two axles with pivoting link members for pivoting about a horizontal plane; and (d) a linkage arrangement configured to pivotally turn, during movement, said frame relative to another frame being coupled to said frame in a serial arrangement therewith.

10. The device of claim 9, wherein said linkage arrangement is configured to pivotally turn said frame at an angle of ninety (90) degrees.

11. The device of claim 9, further comprising four locking members mounted for a pivotal movement at each lower corner of said side member and shaped to engage a bottom portion of said housing, said four locking members operable to move said housing in a vertical direction, whereby a bottom portion of said housing is elevated above a ground surface during movement of said device.

* * * * *